US005207059A

United States Patent [19]

Schexnayder

[11] Patent Number: 5,207,059

[45] Date of Patent: May 4, 1993

[54] HYDRAULIC CONTROL SYSTEM HAVING POPPET AND SPOOL TYPE VALVES

[75] Inventor: Lawrence F. Schexnayder, Joliet, Ill.

[73] Assignee: Caterpillar Inc., Peoria, Ill.

[21] Appl. No.: 821,098

[22] Filed: Jan. 15, 1992

[51] Int. Cl.[5] .......... F16D 31/02

[52] U.S. Cl. .......... 60/465; 60/484; 91/461; 91/443; 91/444; 91/445; 91/464; 91/448; 137/596.14

[58] Field of Search .......... 60/368, 427, 433, 465, 60/471, 484; 91/442, 443, 444, 445, 446, 447, 448, 459, 461, 462, 463; 137/596.14, 596.16; 251/35

[56] References Cited

U.S. PATENT DOCUMENTS

| | | | |
|---|---|---|---|
| 3,906,840 | 9/1975 | Bianchetta et al. | 91/461 X |
| 3,948,146 | 4/1976 | Maurer et al. | 91/464 X |
| 4,093,002 | 6/1978 | Tardy | 91/447 X |
| 4,884,402 | 12/1989 | Strenzke et al. | 60/465 X |
| 4,955,283 | 9/1990 | Hidaka et al. | 91/461 X |
| 4,967,557 | 11/1990 | Izumi et al. | 60/433 X |
| 5,046,309 | 9/1991 | Yoshino | 91/436 X |
| 5,137,254 | 8/1992 | Aardema et al. | 137/596.14 X |
| 5,138,838 | 8/1992 | Crosser | 60/427 X |

*Primary Examiner*—Edward K. Look
*Assistant Examiner*—Todd Mattingly
*Attorney, Agent, or Firm*—John W. Grant

[57] ABSTRACT

Hydraulic control systems are useful for controlling actuation of hydraulic motors. Some such systems use spool type valves while other systems use poppet type valves, both of which have their advantages and disadvantages. The present hydraulic control system is a hybrid system utilizing a combination of both a spool type control valve and poppet type control valves in a single work circuit. Specifically, a spool type control valve has an inlet port connected to a variable displacement pump and a pair of flow amplifying poppet type valves are serially disposed between a pair of motor ports of the spool type valve and a pair of actuating chambers of a double acting hydraulic motor. The spool type control valve is operative to control pump-to-motor flow while one of the poppet type valves is operative to control motor-to-tank flow.

20 Claims, 2 Drawing Sheets

HYDRAULIC CONTROL SYSTEM HAVING POPPET AND SPOOL TYPE VALVES

DESCRIPTION

1. Technical Field

This invention relates to a hydraulic control system and more particularly to a hybrid system having a combination of poppet and spool type valves for actuation of a hydraulic motor.

2. Background Art

Many hydraulic circuits for controlling a reversible hydraulic motor typically include a three position, four way directional control valve having a single spool for controlling fluid flow from a pump to the motor and from the motor to a tank, a pair of line reliefs operatively associated with opposite sides of the reversible hydraulic motor, load check valves to block reverse flow of fluid if the load pressure is higher than the pump pressure at the time the directional control valve is shifted, and makeup valves for providing makeup fluid to a cavitated side of a motor in an overrunning condition.

One of the problems encountered with such circuit is that the use of all those valves to achieve the desired operating parameters of a single circuit generally adds to the cost of each circuit. Another problem encountered is that the directional control valve commonly has a single spool with the timing of the metering slots designed to optimize the control of the pump-to-motor fluid flow. Thus the spool is generally inadequate for metering motor-to-tank fluid flow in an overrunning load condition.

Other hydraulic circuits for controlling reversible hydraulic motors include a plurality of poppet type valves, usually four, for controlling pump-to-motor fluid flow and from motor-to-tank fluid flow. Although the poppet type valves in those circuits reduce the number of valves needed, poppet type valves are generally difficult to control for precisely metering fluid flow therethrough.

In view of the above, it would be desirable to have a hydraulic circuit which utilizes the advantageous features of both poppet valves and spool valves within a single hydraulic system.

The present invention is directed to overcoming one or more of the problems as set forth above.

DISCLOSURE OF THE INVENTION

In one aspect of the present invention, a hydraulic control system for controllable actuation of a hydraulic motor having first and second actuating chambers includes a spool type control valve having an inlet port, a tank port, and first and second motor ports. The control valve has a neutral position at which the motor ports communicate with the tank port and the inlet port is blocked from the tank port and the motor ports. The control valve is movable in a first direction to communicate the inlet port with the first motor port and a second direction to communicate the inlet port with the second motor port. The control valve is moved in one of the first and second directions a distance proportional to a first control signal received thereby. A means is provided for outputting pressurized fluid to the inlet port of the control valve at a flow rate proportional to a second control signal received thereby. Each of a pair of remotely controlled poppet type valves is serially disposed between one of the motor ports and one of the actuating chambers to normally block fluid flow from the actuating chamber to the control port and to permit substantially unrestricted fluid flow from the motor port to the actuating chamber. Each of the poppet type valves is controllably moved to an open position proportional to a third signal received thereby.

BEST MODE FOR CARRYING OUT THE INVENTION

Figure 1:
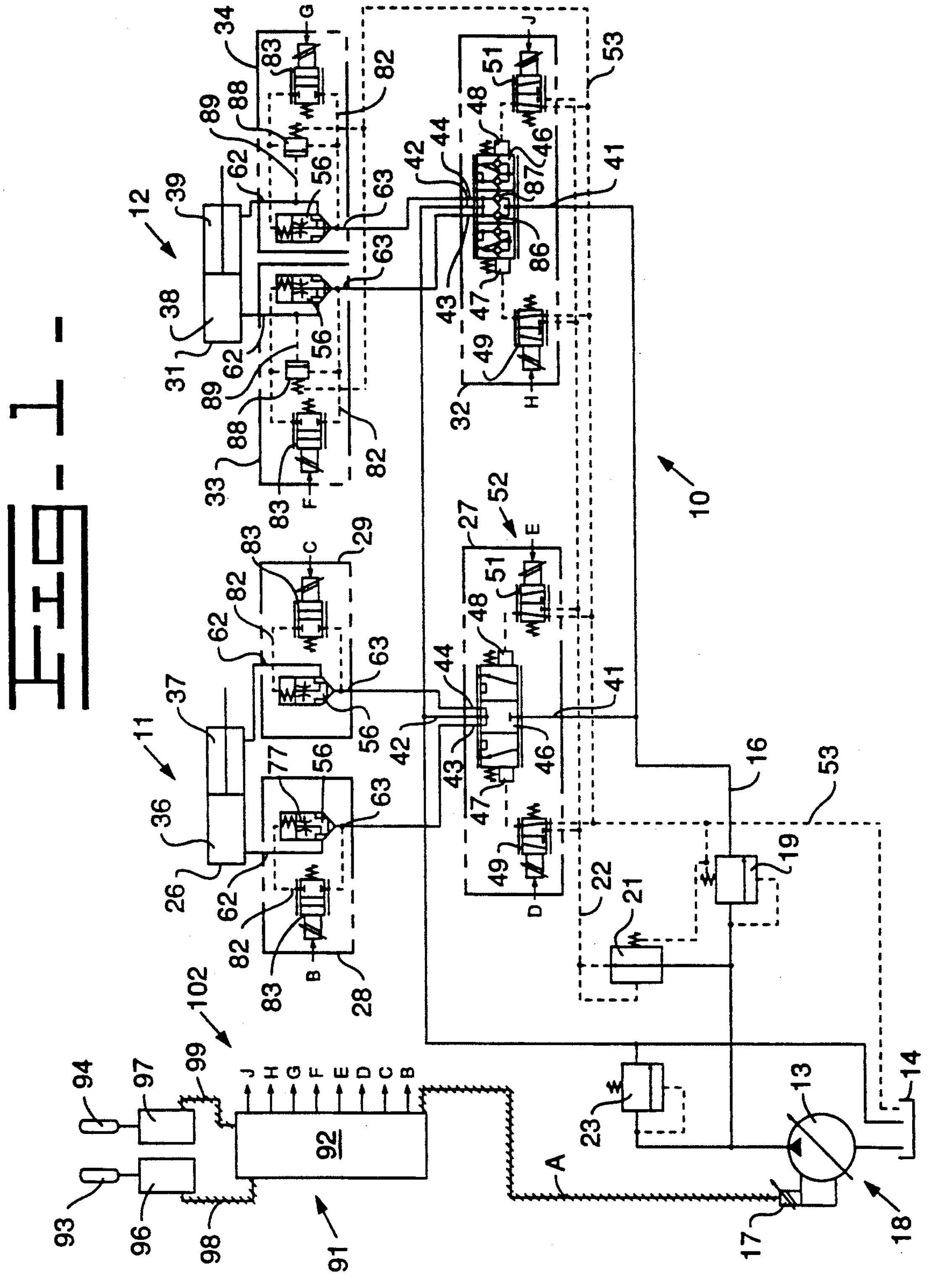
FIG. 1 is a schematic illustration of an embodiment of the present invention.

A control system 10 is shown in association with first and second hydraulic work circuits 11,12. The hydraulic system 10 includes a variable displacement pump 13 connected to a tank 14 and a supply conduit 16. The variable displacement pump 13 has an electronically controlled displacement controller 17 for controlling the displacement of the pump proportional to a control signal directed thereto. The variable displacement pump 13 constitutes a means 18 for outputting pressurized fluid at a flow rate proportional to a control signal received thereby.

A low pressure relief valve 19 is disposed in the supply conduit 16 for maintaining the pressure upstream thereof above a minimum pressure level. A pressure reducing valve 21 is connected to the supply conduit 16 upstream of the relief valve 19 and to a pilot supply line 22. A high pressure relief valve 23 is connected to the supply conduit 16 upstream of the relief valve 19.

The first work circuit 11 includes a hydraulic motor 26, an electrohydraulic proportional spool type control valve 27 and a pair of remotely controlled flow amplifying poppet type valves 28,29. The second work circuit 12 similarly includes a hydraulic motor 31, a spool type control valve 32 and a pair of remotely controlled poppet type valves 33,34. The hydraulic motors 26,31 in this embodiment are double acting hydraulic cylinders having first and second actuating chambers 36,37 and 38,39 respectively.

The control valve 27 has an inlet port 41, a tank port 42 and a pair of motor ports 43,44 with the inlet port 41 being connected to the supply line 16 downstream of the relief valve 19. The control valve also includes a pilot operated elongate valve spool 46, first and second actuating chambers 47,48 disposed at opposite ends of the valve spool 46, and a pair of electrohydraulic proportional valves 49,51 connected to the actuating chambers 47,48 respectively and to the pilot supply line 22. The proportional valves 49,51 constitute a proportional valve means 52 for controlling the position of the valve spool 46 in response to receiving an electrical control signal.

The valve spool 46 is shown at a neutral position at which the tank port 42 communicates with the motor ports 43 and 44 and the inlet port 41 is blocked from the tank port and the motor ports. The valve spool 46 is movable rightwardly in a first direction at which the inlet port 41 communicates with the motor port 43 while the motor port 44 remains in communication with the tank port 42. The valve spool 46 is movable leftwardly in a second direction to communicate the inlet port 41 with the motor port 44 while the motor port 43 remains in communication with the tank port 42.

The proportional valves 49,51 are normally spring biased to the position shown at which the actuating chambers 47 and 48 are in communication with a drain line 53. The proportional valve 49 is movable in a rightward direction to establish communication between the pilot supply line 22 and the actuating chamber 47 in response to receiving an electrical control signal. Similarly, the proportional valve 51 is movable in a leftward direction for establishing communication between the pilot supply line 22 and the actuating chamber 48 in response to receiving an electrical control signal. The fluid pressure established in the respective actuating chambers 47,48 is dependent upon the magnitude of the control signal received by the respective proportional valve. Thus the extent of the movement of the valve spool 46 in either direction is dependent upon the magnitude of the control signal received by the proportional valves 49,51.

Figure 2:
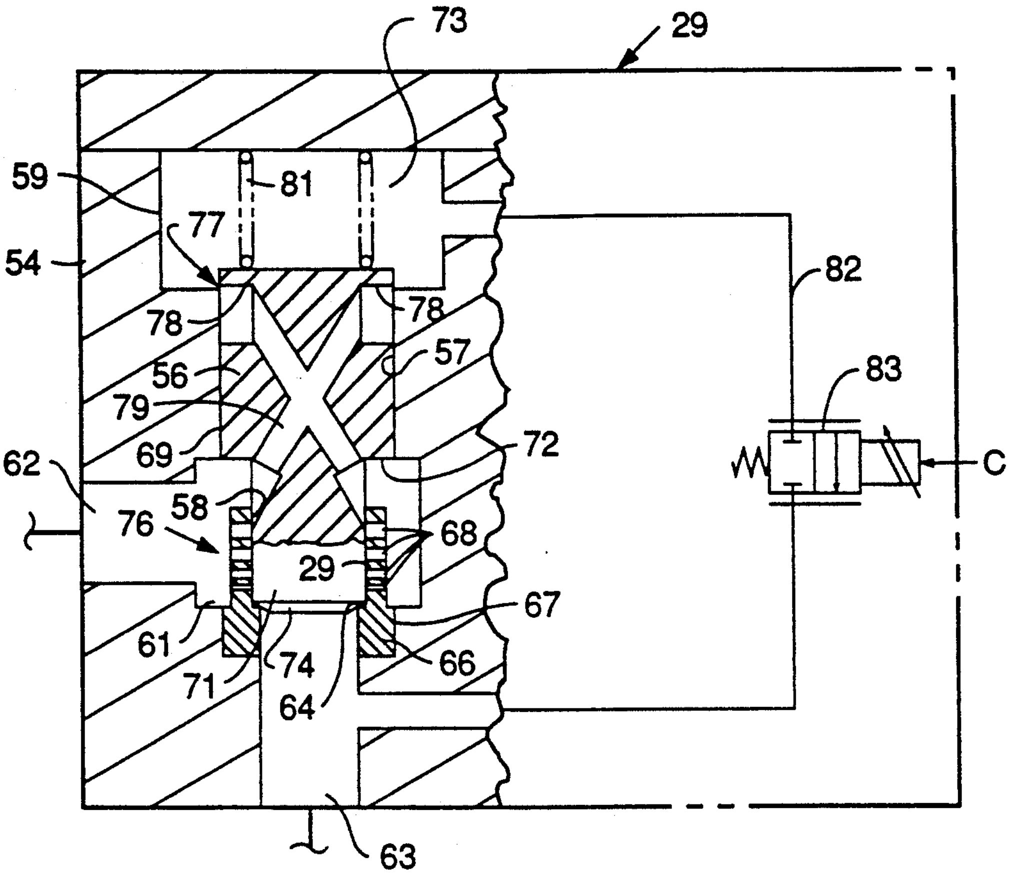
FIG. 2 is a cross-sectional view of a poppet valve schematically shown in FIG. 1.

The poppet valves 28 and 29 are identical and thus only the poppet valve 29 will be described in detail with reference to FIG. 2 with common numerals applied to both poppet valves 28 and 29 in FIG. 1. The poppet valve 29 includes a composite valve body 54 and a valve element 56. The body includes a pair of cylindrical bores 57,58, a pair of axially spaced annuluses 59,61, a port 62 in communication with the annulus 61, another port 63 in communication with the cylindrical bore 58, and a valve seat 64 between the cylindrical bore 58 and the port 63. The cylindrical bore 58 is formed in an annular sleeve 66 suitably seated in a bore 67. A plurality of flow modulating ports 68 extend through the sleeve 66 to communicate the annulus 61 with the cylindrical bore 58.

The valve element 56 has a pair of concentric spool portions 69,71 slidably disposed in the cylindrical bores 57,58 respectively and define an annular reaction surface 72 therebetween. A control chamber 73 is defined by the annulus 59 and the end of the spool portion 69. The spool portion 71 terminates at a conical end portion 74 and cooperates with the ports 68 to provide a main flow regulating orifice 76. A pair of variable area flow control orifices 77 are provided in the spool portion 69 to communicate the port 62 with the control chamber 73. The orifices 77 are in the form of a pair of axially extending rectangular slots 78 connected to the port 62 through a pair of diagonally extending passages 79. A minimum flow area of the slots 78 is always open to continuously communicate the port 62 with the control chamber 77. A lightweight spring 81 disposed between the valve element 56 and the body 54 resiliently urges the conical end portion 74 into sealing engagement with the valve seat 64.

The poppet valve 29 also includes a flow regulating passage 82 connected to and extending between the control chamber 73 and the port 63, and an electrohydraulic proportional flow regulating valve 83 disposed in the passage 82. The valve 83 is movable between a closed position blocking communication through the regulating passage 82 and an infinitely variable open position for regulating fluid flow through the regulating passage 82. The proportional valve 83 is moved to the regulating position in response to receiving an electrical control signal.

The ports 62 and 63 of the poppet valve 28 are connected to the actuating chamber 36 and the motor port 43 respectively. Similarly the ports 62 and 63 of the poppet valve 29 are connected to the actuating chamber 37 and the motor port 44 respectively.

The spool type valve 32 is constructed similarly to the spool type valve 27 described above and common reference numerals are used to designate similarly constructed elements. However, the poppet type valve 32 also includes a pair of check valves 86,87 to permit free flow of fluid from the motor ports 43,44 to the inlet port 41 at all positions of the spool 46.

The poppet type valves 33,34 are also similar to the poppet type valve 29 fully described above and common reference numerals used in describing the poppet valve 29 are used for these valves. However, both of the poppet type valves 33,34 include a relief valve 88 connected to the flow regulating passage 82 in parallel to the proportional valve 83. A pilot line 89 connects the relief valve to the respective actuating chamber 38 or 39.

The hydraulic system 10 includes an electronic control 91 having a microprocessor 92 connected to the displacement controller 17 through an electrical lead line A. Similarly, the microprocessor 92 is connected to the proportional valves 83 and 49,51 through lead lines B, C, D, E, F, G, H and J, portions of which have been omitted for illustrative convenience. A pair of control levers 93,94 are operatively connected to a pair of operational signal generators 96,97 through a pair of electrical lead lines 98,99. The control levers 93,94, the signal generators 96,97, and the lead lines 98,99 provide a means 101 for outputting command signals to establish a desired fluid flow rate and direction of fluid flow through the work circuits 11,12.

The microprocessor 92 provides a control means 102 for processing the command signals, for producing a plurality of discrete control signals in response to receiving the command signals, and for outputting control signals on the basis of the command signals.

Figure 3:
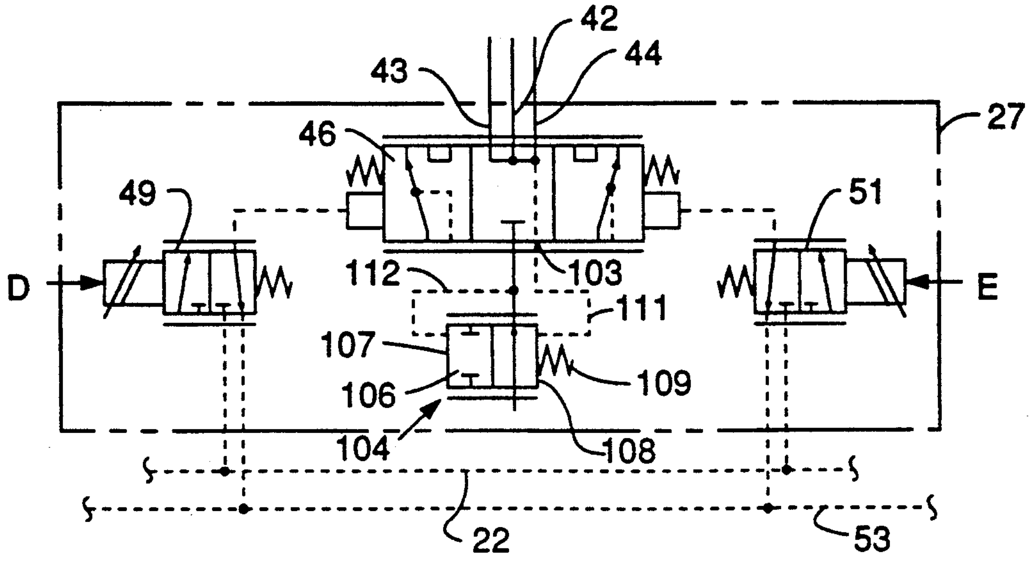
FIG. 3 is a schematic illustration of an embodiment of another valve of the present invention.

An alternate embodiment of a spool type control valve is disclosed in FIG. 3. It is noted that the same reference numerals of the first embodiment are used to designate similarly constructed counterpart elements of this embodiment. In this embodiment, however, the spool type control valve 27 includes a load signal port 103 connected to the motor ports 43 and 44 when the valve spool 46 is moved in the first and second directions respectively, and a valve means 104 for maintaining a predetermined pressure drop across the valve spool 46 when the valve spool is moved in the first and second directions. The valve means 104 includes a pressure compensated flow control valve 106 disposed between the inlet port 41 and the valve spool and has opposite ends 107,108. The flow control valve is movable between a first position establishing communication through the inlet port 41 and a second position blocking communication through the inlet port 41. A spring 109 is disposed at the end 108 resiliently urging the flow control valve to the first position. A pilot passage 111 connects the load signal port to the end 108 and another pilot passage 112 connects the end 107 with the inlet port between the flow control valve and the valve spool.

While the hydraulic system 10 of this embodiment discloses only two work circuits 11,12, it is contemplated that the hydraulic system can include additional work circuits and additional control levers. For example, the present two circuit embodiment is applicable to vehicles having two separate work circuits such as loaders. Hydraulic excavators are examples of vehicles having multi work circuits.

INDUSTRIAL APPLICABILITY

In operation, when the control levers 93,94 are in the centered position shown, no command signals are being transmitted through the lead lines 98,99 to the microprocessor 92. When the microprocessor is not receiving any command signals, no control signals are being outputted through any of the lead lines A through J such that the control valves 27 and 32 are in their neutral position to block the inlet ports 41 from the motor ports 43 and 44. Under this condition the valve elements 56 of the poppet type valves 28,29,33,34 block fluid flow from the respective actuating chambers 36,37,38,39. Moreover when no command signal is being received by the displacement controller 17, the displacement of the pump 13 in this embodiment is reduced to a position to maintain a low standby pressure in the supply conduit 16.

To extend the hydraulic motor 36, for example, the operator moves the control lever 93 rightwardly an amount corresponding to the speed at which he wants the motor to extend. In so doing, the operational signal generator 96 senses the operational position of the lever 93 and outputs a command signal through the lead line 98 to the microprocessor 92. The microprocessor 92 processes the command signal in accordance with preprogrammed criteria and produces first, second, and third discrete control signals. The first control signal is directed through the lead line D to the proportional valve 49 of the spool type control valve 27 causing it to move rightwardly to direct pilot fluid from the supply line 22 to the actuating chamber 47. The pressurized pilot fluid in the actuating chamber 47 moves the spool 46 rightwardly to connect the inlet port 41 to the motor port 43 and the motor port 44 to the tank port 42. The extent of rightward movement of the spool 46 is commensurate with the first control signal transmitted through the lead line D. Under this operational condition the spool is moved sufficiently to permit fluid flow from the supply line 16 through the control valve 27 at a first predetermined pressure drop. Moreover, the opening between the motor port 44 and the tank port 42 provides substantially unrestricted fluid flow therethrough with the motor-to-tank flow being controlled by the poppet type valve 29 as hereinafter described.

The second control signal is transmitted though lead line A to the displacement controller 17 causing the pump displacement to increase to a level to provide a flow rate to achieve the desired operating speed of the hydraulic motor 26. The fluid from the pump passes through the control valve 27 unseats the valve element 56 of the poppet type valve 28 allowing the fluid to pass substantially unrestricted therethrough to the actuating chamber 36.

The third control signal from the microprocessor 92 is transmitted through the lead line C to the proportional control valve 83 of the poppet type valve 29 causing the proportional valve to move leftwardly to establish a flow path through the flow regulating passage 82. The fluid flow rate through the regulating passage 82 determines the degree of opening of the valve element 56 of the poppet valve 29 and is proportional to the third control signal being transmitted to the proportional valve 83. In this embodiment the magnitude of the third control signal is selected to cause the poppet valve element 56 to move to a position to generate a second predetermined pressure drop thereacross to slightly restrict the flow of fluid being exhausted from the actuating chamber 37 of the hydraulic cylinder 26 due to the extension thereof. Restricting the fluid flow in this manner permits the extension speed of the hydraulic motor 26 to be substantially controlled by the displacement setting of the pump regardless of whether the extension is caused solely by the incoming fluid to the chamber 36 or by an external load being applied to the hydraulic motor. The first control signal is transmitted through the line D slightly ahead of the second control signal being transmitted through the lead line A. This allows the control valve 27 to start opening slightly ahead of the increase in the displacement of the pump so that high pressure is not generated between the pump and the control valve. The first and second predetermined pressure drops can be pre-programmed so that one or both decreases as flow rate increases whereby substantially no pressure drops exist when the maximum motor speed is wanted.

Retracting the hydraulic motor 26 is accomplished in a similar manner by moving the control lever 93 counterclockwise so that the first control signal is directed through lead line E to the proportional valve 51 of the spool type control valve 27, the second control signal is directed to the displacement controller 17, and the third control signal is directed through lead line B to the proportional valve 83 of the poppet type valve 28.

Extension of the hydraulic motor 31 is similar to that described above but is controlled by manipulation of the lever 94 causing a command signal to be outputted from the signal generator 97 through the lead line 99 to the microprocessor 92. The microprocessor in turn transmits a first control signal through the line H to the proportional valve 49 of the spool valve 32, a second control signal through the line A to the displacement controller, and a third control signal through the line G to the proportional valve 83 of the poppet type valve 34. Finally, retraction of the hydraulic motor 31 is achieved by counterclockwise movement of the control lever 94 so that the first control signal is directed through lead line J to the proportional valve 51 of the poppet type valve 32, the second control signal is directed through the lead line A to the displacement controller 17, and the third control signal is transmitted through lead line F to the proportional valve 83 of the poppet type valve 33.

The above described operations are applicable only when one of the hydraulic cylinders 26 or 31 is being actuated. When both of the hydraulic cylinders 26,31 are being actuated simultaneously, the microprocessor 92 must act accordingly to provide sufficient flow to achieve the desired operating speeds of both cylinders. For example, if both levers 93 and 94 are moved clockwise to cause extension of both hydraulic cylinders 26 and 31, the microprocessor 92 adds the command signals inputted thereto through the lead lines 98 and 99 calculates the magnitude of the second control signal based on the summation of the command signals and outputs the second control signal through the lead line A to the displacement controller 17 to change the displacement of the pump so that the output is sufficient to extend both motors at the desired speed. Under this condition, a pair of first control signals are outputted through the lines D and H to the proportional valves 49 of the spool type control valves 27 and 32 proportional to the command signals from the signal generators 96 and 97. The spools 46 of the control valves move rightwardly to connect the inlet ports 41 to the motor ports. A pair of third signals are transmitted through lead lines C and G to the proportional valves 83 of the poppet type valves 29 and 34 causing them to open an amount proportional to the third control signals.

To simultaneously extend the hydraulic motor 26 and retract the hydraulic motor 31, the control lever 93 is moved clockwise and the control lever 94 moved counterclockwise. The microprocessor 92 reacts in a manner similar to that described immediately above except that one of the first control signals is directed to the proportional valve 49 of the control valve 27 and the other first control signal is directed to the proportional valve 51 of the control valve 32 and one of the third control signals is directed to the proportional valve 83 of the poppet valve 29 and the other third control signal is transmitted to the proportional valve 83 of the poppet type valve 33. The microprocessor 92 reacts similarly to that described above when both cylinders are being retracted or when the hydraulic cylinder 26 is being retracted and the hydraulic cylinder 31 is being extended.

The relief valves 88 in the poppet type control valves 33 and 34 provide a line relief type operation when a fluid pressure is generated in one of the actuating chambers 38 or 39 due to an external force being exerted on the hydraulic cylinder 31. For example, if an external force tending to retract the hydraulic motor 31 causes the fluid pressure in the actuating chamber 38 to exceed a preselected value, the relief valve 88 of the valve 33 opens to create a flow path through the flow regulating passage 82. This allows the valve element 56 of the valve 33 to unseat to permit the fluid in the actuating chamber 38 to be expelled through the valve 33 to the motor port 43 of the control valve 32 and exhausted through the tank port 42. If the above event happens when the valve spool 46 of the control valve 32 is at a position which would severely restrict communication between the motor port and the tank port 42, the appropriate check valve 86 or 87 would be unseated to communicate the motor port 43 with the inlet port 41 where the fluid would pass through the supply conduit 46 and be relieved through the main relief valve 23.

The control valve 27 of FIG. 3 is moved to its operating positions similarly to that described above. However, the pressure compensated flow control valve 106 functions in the conventional manner to maintain a predetermined pressure drop across the valve spool when the valve spool is at one of its operating positions regardless of the load pressure in the motor 26 and/or the pressure in the supply conduit Other aspects, objects and advantages of this invention can be obtained from a study of the drawings, the disclosure and the appended claims.

I claim:

1. A hydraulic control system for controllable actuation of a hydraulic motor having first and second actuating chambers comprising:

a spool type control valve having an inlet port, a tank port, and first and second motor ports, and an elongate valve spool, the control valve having a neutral position at which the motor ports communicate with the tank port and the inlet port is blocked from the tank and motor ports, the valve spool being movable in a first direction to communicate the inlet port with the first motor port and a second direction to communicate the inlet port with the second motor port, the valve spool being moved in one of the first and second directions a distance proportional to a first control signal received by the control valve;

means for outputting pressurized fluid to the inlet port of the control valve at a flow rate proportional to a second control signal received thereby; and a remotely controlled flow amplifying poppet type valve serially disposed between the first motor port and one of the actuating chambers to normally block fluid flow from the actuating chamber to the first motor port and to permit substantially unrestricted fluid flow from the first motor port to the actuating chamber, the poppet valve being controllably moved to an open position proportional to a third control signal received thereby.

2. The hydraulic control system of claim 1 wherein the poppet type valve includes a first port connected to the first motor port, a second port connected to the one actuating chamber of the hydraulic motor, an annular valve seat disposed between the first and second ports, a cylindrical bore, a valve element having a end portion and being slidably disposed in the cylindrical bore defining a control chambers, a variable orifice between the second port and the control chamber, a flow regulating passage communicating the control chamber with the first port, and a flow regulating valve disposed in the flow regulating passage to controllably regulate the fluid flow through the flow regulating passage, the valve element being movable between a closed position at which the end portion sealingly engages the valve seat and an open position at which a main flow regulating orifice is established between the first and second ports.

3. The hydraulic control system of claim 2 wherein the flow regulating valve is an electrohydraulic proportional valve.

4. The hydraulic control system of claim 3 including another flow amplifying remotely controlled poppet type valve disposed between the second motor port and the other actuating chamber of the motor.

5. The hydraulic control system of claim 4 wherein each of the poppet type valves include a relief valve disposed in parallel with the proportional valve and being operative to vent the actuating chamber when the fluid pressure therein exceeds a preselected value.

6. The hydraulic control system of claim 5 wherein the spool type valve is a electrohydraulic valve movable in the opposite directions in response to receiving an electrical signal.

7. The hydraulic control system of claim 6 wherein the spool type valve includes a pair of check valves disposed between the motor ports and the inlet port in a manner to block fluid flow between the inlet port and the motor ports and to provide substantially unrestricted fluid flow between the motor ports and the inlet port when the pressure in the motor port is higher than the pressure in the inlet port.

8. The hydraulic control system of claim 1 wherein the spool type control valve includes valve means for maintaining a predetermined pressure drop across the valve spool when the valve spool is moved in the first and second directions.

9. The hydraulic control system of claim 8 wherein the valve means includes a pressure compensated flow control valve disposed between the inlet port and the valve spool and being movable between a first position establishing communication through the inlet port and a second position blocking communication through the inlet port.

10. The hydraulic control system of claim 9 wherein the spool type control valve includes a load signal port, and the pressure compensated flow control valve includes opposite ends, a spring disposed at one end resiliently urging the flow control valve to the first position, a pilot passage connecting the load signal port to the one end, and another pilot passage connecting the other end with the inlet port between the flow control valve and the valve spool.

11. A hydraulic control system for controlling actuation of a hydraulic motor having first and second actuating chambers comprising:

a control lever having a neutral position and movable in opposite directions therefrom;

means for outputting a command signal corresponding to the direction and degree of movement of the handle from the neutral position;

control means for processing the command signal and for producing and outputting first, second and third discrete control signals on the basis of the command signal;

a spool type control valve having an inlet port, a tank port, first and second motor ports, and an elongate valve spool, the control valve having a neutral position at which the motor ports communicate with the tank port and the inlet port is blocked from the tank and motor ports, the valve spool being movable in a first direction to communicate the inlet port with the first motor port and a second direction to communicate the inlet port with the second motor port, the control valve being connected to the control means for receiving the first control signal and the valve spool being moved in the appropriate direction a distance proportional to the first control signal;

a variable displacement pump connected to the inlet port of the control valve and having a displacement control means for receiving the second control signal and controlling the displacement of the pump in proportion to the second control signal; and a flow amplifying remotely controlled poppet type valve serially disposed between the first motor port and one of the actuating chambers in a manner to controllably meter fluid flow from the one actuating chamber to the first motor port when the third control signal is directed thereto and to normally block fluid flow from the one actuating chamber to the first motor port in the absence of the third control signal thereto, the poppet type valve being moved to an open position establishing substantially unrestricted fluid flow therethrough in response to fluid flow from the first motor port to the one actuating chamber.

12. The hydraulic control system of claim 11 wherein the poppet type valve includes a first port connected to the first motor port, a second port connected to the one actuating chamber of the hydraulic motor, an annular valve seat disposed between the first and second ports, a cylindrical bore, a valve element having a end portion and being slidably disposed in the cylindrical bore defining a control chamber, a variable orifice between the second port and the control chamber, a flow regulating passage communicating the control chamber with the first port, and a flow regulating valve disposed in the flow regulating passage to controllably regulate the fluid flow through the flow regulating passage, the valve element being movable between a closed position at which the end portion sealingly engages the valve seat and an open position at which a main flow regulating orifice is established between the first and second ports.

13. The hydraulic control system of claim 12 wherein the flow regulating valve is an electrohydraulic proportional valve.

14. The hydraulic control system of claim 13 including another flow amplifying remotely controlled poppet type valve disposed between the second motor port and the other actuating chamber of the motor.

15. The hydraulic control system of claim 14 wherein each of the poppet type valves include a relief valve disposed in parallel with the proportional valve and being operative to vent the actuating chamber when the fluid pressure therein exceeds a preselected value.

16. The hydraulic control system of claim 15 wherein the spool type valve is an electrohydraulic valve movable in the opposite directions in response to receiving an electrical signal.

17. The hydraulic control system of claim 16 wherein the spool type valve includes a pair of check valves disposed between the motor ports and the inlet port in a manner to block fluid flow between the inlet port and the motor ports and to provide substantially unrestricted fluid flow between the motor ports and the inlet port when the pressure in the motor port is higher than the pressure in the inlet port.

18. The hydraulic control system of claim 11 wherein the spool type control valve includes valve means for maintaining a predetermined pressure drop across the valve spool when the valve spool is moved in the first and second directions.

19. The hydraulic control system of claim 18 wherein the valve means includes a pressure compensated flow control valve disposed between the inlet port and the valve spool and being movable between a first position establishing communication through the inlet port and a second position blocking communication through the inlet port.

20. The hydraulic control system of claim 19 wherein the spool type control valve includes a load signal port, and the pressure compensated flow control valve includes opposite ends, a spring disposed at one end resiliently urging the flow control valve to the first position, a pilot passage connecting the load signal port to the one end, and another pilot passage connecting the other end with the inlet port between the flow control valve and the valve spool.

* * * * *